United States Patent

Saur et al.

[11] Patent Number: 5,996,619
[45] Date of Patent: Dec. 7, 1999

[54] CONTROL VALVE

[75] Inventors: Roland Saur, Stuttgart; Manfred Kurz, Ditzingen, both of Germany

[73] Assignee: Behr Thermot-tronik GmbH & Co., Germany

[21] Appl. No.: 09/137,604

[22] Filed: Aug. 21, 1998

[30] Foreign Application Priority Data

Aug. 26, 1997 [DE] Germany .......... 297 15 258 U

[51] Int. Cl.[6] .......... F16K 15/00; F16K 47/00
[52] U.S. Cl. .......... 137/543.23; 251/118; 251/121
[58] Field of Search .......... 137/543.23; 251/120, 251/121, 118

[56] References Cited

U.S. PATENT DOCUMENTS

| | | | |
|---|---|---|---|
| 1,116,794 | 11/1914 | Butler | 137/543.23 |
| 1,128,092 | 2/1915 | Barrett | 137/515.5 |
| 2,161,282 | 6/1939 | Crowell | 137/515.5 |
| 3,565,100 | 2/1971 | Pfleger | 137/543.23 |
| 4,290,553 | 9/1981 | Molgaard et al. | 236/42 |
| 4,611,786 | 9/1986 | Jorgensen et al. | 251/118 |
| 4,715,579 | 12/1987 | Hammarstedt | 251/121 |
| 4,842,015 | 6/1989 | Haak et al. | 137/543.23 |
| 4,953,589 | 9/1990 | Nakamura | 137/543.23 |
| 5,033,506 | 7/1991 | Bofinger et al. | 137/543.23 |
| 5,580,029 | 12/1996 | Bjerggaard | 251/121 |

*Primary Examiner*—Denise L. Ferensic
*Assistant Examiner*—Joanne Y. Kim
*Attorney, Agent, or Firm*—Kennedy Covington Lobdell & Hickman

[57] ABSTRACT

A control valve having a sliding valve member body movable into valve closing position against a valve seat in an outflow conduit. The body has a conical outer end for controlling the flow through the valve and a plurality of fins extending radially from the outer end into engagement with the outflow conduit to guide the body.

12 Claims, 1 Drawing Sheet

CONTROL VALVE

FIELD OF THE INVENTION

The present invention relates to a control valve for opening or closing a valve chamber and which has a piston-like sliding valve member for operation in conjunction with a valve seat.

OBJECT AND SUMMARY OF THE INVENTION

It is the object of the invention to embody a control valve of the type mentioned in such a way that the regulating distances for the sliding valve member body between the closed position and the open position can be kept short while, on the other hand, in the open position the flow resistance and the pressure losses caused thereby through the valve are as small as possible.

This object is attained in that several radially extending fins are provided in an extension of the valve end of the sliding valve member body for extension through the valve seat, which fins serve as guide extensions for guiding the sliding valve member body in its axial direction.

On the one hand, the fins are used as guides for the axial guidance of the sliding valve member body, and on the other hand, as flow guides to assist in keeping the flow losses of the opened valve relatively small.

In a development of the invention it is provided that the sliding valve member body is equipped with a sealing ring in the area adjacent its valve end. Thus, the sliding valve member body provides a valve seal by means of this sealing ring, so that no extended displacement distance into the interior of the valve seat is required for achieving a good seal. Therefore the regulating distance between the closed and open positions can be correspondingly short.

In a further development of the invention it is provided that the fins are arranged at an axial distance from the sealing ring. By means of this it is achieved that upon opening, a relatively large flow cross section is immediately released, which is not hampered by the dimensions of the fins.

In a further development of the invention it is provided that the front end of the sliding valve member body has the approximate shape of a cone, from which the fins project radially. In this embodiment the valve end also acts as a flow guide surface which gently deflects the flow in the axial direction, so that flow losses are further reduced. In this connection it is advantageous if the cone surface is concavely curved for smooth guidance of the flow through the valve.

Further advantages and characteristics of the invention will be apparent from the following detailed description of the preferred embodiment illustrated in the accompanying drawings.

DETAILED DESCRIPTION OF THE PREFERRED EMBODIMENTS

Figure 1:
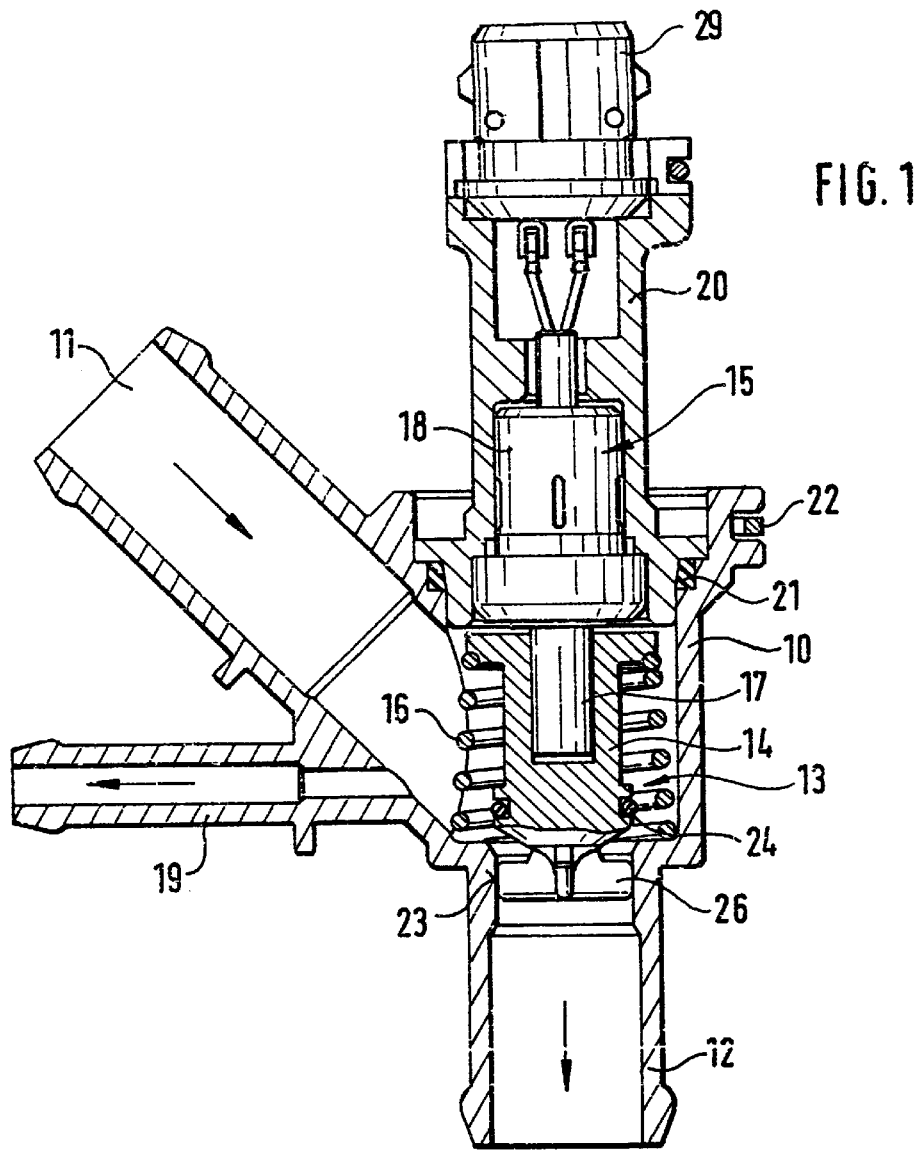
FIG. 1 is an axial sectional view through a control valve of the preferred embodiment of the present invention.

The control valve of the preferred embodiment of FIG. 1 is arranged, for example, in the coolant circuit of an internal combustion engine of a motor vehicle, and is used for opening or closing a connection of the coolant circuit with a heat exchanger of an auxiliary device, in particular a passenger compartment heater. The control valve includes a valve housing 10 forming a valve chamber, to which an inflow conduit 11 leads and to which an outflow conduit 12 is connected. The connection of the valve chamber with the outflow conduit 12 is opened or closed by a sliding valve member 13, which will be further explained in detail below. The sliding valve member 13 is in the form of a piston-shaped sliding valve member body 14 which, in the exemplary embodiment, can be moved into the closed position by means of a thermostatic operating element 15 against the urging of a return spring 16. The thermostatic operating element is of conventional design, containing an expansion material and an electric heating device, which is connected to an electric connector (not shown). By supplying the electrical heating device with current, the expansion material can be heated to such an extent that it changes its physical condition and drives a working piston (not shown) out of a guide element 17 of the stationary arranged housing 18 of the thermostatic operating element 15. In this case the working piston then takes along the sliding valve member body 14, which is guided on the guide element 17, against the action of the return spring 16, and in the process pushes the sliding valve member body 14 into the outflow conduit 12 sufficiently far, so that the latter is closed.

The expansion material of the thermostatic operating element 15 is designed in such a way that it changes its physical condition only at a temperature which clearly lies above the temperature of the medium to be blocked, for example the coolant of a cooling installation of an internal combustion engine of a motor vehicle. Following the termination of the current supply to the electric heating device, the flowing medium, for example the coolant, then causes the thermostatic operating element 15 to be sufficiently cooled, so that the return spring 16 pushes the sliding valve member body 14 back into the open position and in the process pushes the working piston into the housing of the thermostatic operating element.

In order to maintain a coolant flow in the area of the valve chamber and therefore in the area of the thermostatic operating element 15, even when the connection of the valve chamber with the outflow conduit 12 is blocked, a return flow conduit 19 is connected with the valve chamber, which adds the coolant, for example, at a suitable location to the coolant circuit. The thermostatic operating element 15 is sealingly inserted by means of the interposition of a sealing ring into a cover-like component 20, which in turn is sealingly held by means of the interposition of a sealing ring 21 on the valve housing 10. The cover-like component 20,is held by means of a shackle spring 22 on the valve housing 10 opposite the outflow conduit 12.

In place of a thermostatic operating element 15 for displacing the sliding valve member body 14 it is possible to provide another driving element, for example an electrical servo motor, or also pneumatic or hydraulic displacement elements.

Figure 2:
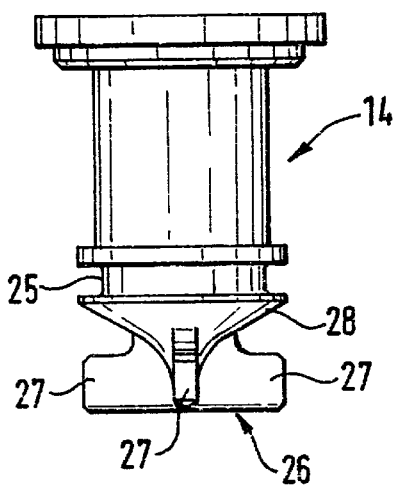
FIG. 2 is an elevational view of the piston-shaped sliding valve member body of the control valve of FIG. 1 on an enlarged scale.
Figure 3:
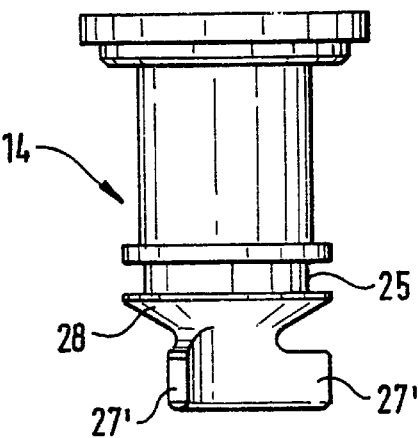
FIG. 3 is an elevational view of a modified embodiment of the sliding valve member body of FIGS. 1 and 2.

In the area of its end adjacent a sliding valve seat 23 formed in the outflow conduit 12, the piston-shaped sliding valve member body 14 is provided with a sealing ring 24. An annular groove 25 receives the sealing ring, as represented in FIGS. 2 and 3. The sealing ring 24, an 0ring in particular, radially projects outwardly beyond the annular groove 25, so that in the closed position it rests against the chamfered end of the sliding valve seat 23 while being elastically deformed, and in this way provides a dependable seal.

The piston-shaped sliding valve member body 14 has a guide 26 extending axially outward from its valve seat engaging end through the valve seat into the outflow conduit, by means of which it is guided or centered with respect to the valve seat 23, even in the open position represented in FIG. 1. This guide extension 26 is designed in such a way that, with the valve open, the flow resistance between the inflow connector 11 and the outflow connector 12 is as small as possible, i.e. the flow resistance and along with it the pressure loss during passage through the sliding valve.

In the preferred embodiment of FIGS. 1 and 2, the guide extension 26 has four fins 27 attached to the valve seat engaging end 28 of the sliding valve member body at an axial spacing from the sealing ring 24 and extending radially into engagement with the outflow conduit. The valve seat engaging end of the sliding valve member body tapers in an essentially cone-shape in the flow direction. As can be seen in FIG. 2 in particular, the surface of the cone of the end 28 of the sliding valve member body 14 tapers in an approximately concave manner in the flow direction, so that the flow is deflected smoothly in the axial direction by the surface of the cone and the fins 27, which fins extend over only a portion of the axial extent of the cone. Also, this results in an opening of the valve with no noticeable sudden expansions so that the flow resistance and, therefore, the pressure loss is relatively small.

The number of fins on the guide extension 26 can be arbitrarily selected. Since the sliding valve member body 14 is already guided on the guide insert 17 of the thermostatic operating element 15 or, with a different drive on a similar component, two fins can be sufficient to center the sliding valve member body 14. However, suitably four fins 27 are provided, although three fins 27' may also be utilized as in the modified embodiment in FIG. 3. These fins 27', which are arranged at angular distances of 120°, adjoin the frustoconically designed end 28 of the sliding valve member body, wherein the subsequent surfaces between the fins 27' have a spatially curved contour, which assures a smooth flow transition without stages.

The sliding valve member body 14 in FIGS. 2 or 3 can advantageously be produced as a molded article of plastic or of metal, so that it is possible in a cost-efficient manner to produce a contour of the end of the sliding valve member body and the fins 27, 27' which is advantageous to flow.

As can be seen from FIG. 1, the inflow conduit 11 is connected in an inclined manner to the valve chamber, wherein a flow component in the direction toward the outflow conduit is provided. The end 28 of the sliding valve member is designed in such a way that its cone angle has a dimension of approximately 30°, so that it is particularly well suited for an oblique inflow, and the concave shape results in the surface extending approximately axially at the outer extremity of the cone.

What is claimed is:

1. A valve arrangement for controlling fluid flow in a coolant circuit of an internal combustion engine, comprising:
   a valve housing forming a valve chamber for fluid flow therethrough;
   an inflow conduit disposed in fluid communication with said valve chamber for fluid flow into said valve chamber;
   an outflow conduit disposed in fluid communication with said valve chamber for fluid flow from said valve chamber;
   a piston-like valve body disposed for movement within both said valve chamber and said outflow conduit between a closed position in which fluid flow into said outflow conduit is closed and an open position in which fluid flow into said outflow conduit is open;
   a guide extension extending axially from said valve body within said outflow conduit, said guide extension including a plurality of fins extending radially toward engagement with said outflow conduit;
   a spring disposed between said valve housing and said valve body such that said spring urges said valve body toward said open position against the fluid flow through said valve chamber from said inflow conduit to said outflow conduit; and
   a thermostatic operating element mounted to said valve housing and attached to said valve body for controlled displacement of said valve body between said closed position and said open position.

2. The valve arrangement according to claim 1, wherein said valve body is disposed for sliding within said outflow conduit between a plurality of positions in which fluid flow into said outflow conduit is closed.

3. The valve arrangement according to claim 1, further comprising a sealing ring disposed about said valve body for engagement with said outflow conduit when said valve body is disposed in said closed position.

4. The valve arrangement according to claim 3, wherein an axial spacing exists between said fins and said sealing ring.

5. The valve arrangement according to claim 1, wherein an end of said valve body disposed for movement within said outflow conduit has the approximate shape of a cone, said fins projecting axially therefrom.

6. The valve arrangement of claim 5, wherein said fins axially extend along only a portion of an axial extent of said cone-shaped end of said valve body.

7. The valve arrangement of claim 6, wherein a cone angle of said cone-shaped end of said valve body is approximately 30°.

8. The valve arrangement of claim 6, wherein said cone-shaped end of said valve body includes a tapering tip concave in shape such that said tapering tip of said end of said valve body approximately extends only axially within said outflow conduit.

9. The valve arrangement of claim 1, wherein the direction of fluid flow into said valve chamber from said inflow conduit is oblique to the direction of fluid flow from said valve chamber into said outflow conduit.

10. The valve arrangement of claim 3, wherein the direction of fluid flow into said valve chamber from said inflow conduit is directed into said outflow conduit.

11. A valve arrangement for controlling fluid flow in a coolant circuit of an internal combustion engine, comprising:
   a valve housing forming a valve chamber for fluid flow therethrough;
   an inflow conduit disposed in fluid communication with said valve chamber for fluid flow into said valve chamber;
   an outflow conduit disposed in fluid communication with said valve chamber for fluid flow from said valve chamber;
   a piston-like valve body disposed for movement within both said valve chamber and said outflow conduit between a closed position in which fluid flow into said outflow conduit is closed and an open position in which fluid flow into said outflow conduit is open;

a guide extension extending axially from said valve body within said outflow conduit, said guide extension including a plurality of fins extending radially toward engagement with said outflow conduit;

a spring disposed between said valve housing and said valve body such that said spring urges said valve body toward said open position against the fluid flow through said valve chamber from said inflow conduit to said outflow conduit; and means for controlled displacement of said valve body between said closed position and said open position.

12. A valve arrangement for controlling fluid flow in a coolant circuit of an internal combustion engine, comprising:

a valve housing forming a valve chamber for fluid flow therethrough;

an inflow conduit disposed in fluid communication with said valve chamber for fluid flow into said valve chamber and an outflow conduit disposed in fluid communication with said valve chamber for fluid flow from said valve chamber such that the direction of fluid flow into said valve chamber from said inflow conduit is oblique to the direction of fluid flow from said valve chamber into said outflow conduit, the direction of fluid flow into said valve chamber from said inflow conduit being directed into said outflow conduit;

a piston-like valve body disposed for movement within both said valve chamber and said outflow conduit between a plurality of closed positions in which fluid flow into said outflow conduit is closed and a plurality of open positions in which fluid flow into said outflow conduit is open, an end of said valve body disposed for movement within said outflow conduit having the approximate shape of a cone;

a sealing ring disposed about said valve body for engagement with said outflow conduit when said valve body is disposed in a said closed position;

a guide extension extending axially from said valve body within said outflow conduit, said guide extension including a plurality of fins projecting axially from said cone-shaped end of said valve body and extending radially toward engagement with said outflow conduit;

a spring disposed between said valve housing and said valve body such that said spring urges said valve body toward one of said open positions against the fluid flow through said valve chamber from said inflow conduit to said outflow conduit; and a thermostatic operating element mounted to said valve housing and attached to said valve body for controlled displacement of said valve body between said plurality of closed positions and said plurality of open positions.

* * * * *